US007805799B2

(12) United States Patent
Reid et al.

(10) Patent No.: US 7,805,799 B2
(45) Date of Patent: Oct. 5, 2010

(54) BREAKAWAY MOUNTING BRACKET ASSEMBLY FOR A WIPER SYSTEM

(75) Inventors: Alex Reid, Lake Orion, MI (US); Mike Wilson, Clarkston, MI (US); Wayne Francis Burke, Waterford, MI (US)

(73) Assignee: Trico Products Corporation, Rochester Hills, MI (US)

( * ) Notice: Subject to any disclaimer, the term of this patent is extended or adjusted under 35 U.S.C. 154(b) by 1156 days.

(21) Appl. No.: 11/397,049

(22) Filed: Apr. 3, 2006
(Under 37 CFR 1.47)

(65) Prior Publication Data

US 2007/0124887 A1    Jun. 7, 2007

Related U.S. Application Data

(60) Provisional application No. 60/668,024, filed on Apr. 4, 2005.

(51) Int. Cl.
*B60S 1/18* (2006.01)
*B60S 1/06* (2006.01)
(52) U.S. Cl. ............... 15/250.31; 15/250.3; 296/96.17; 403/224; 403/DIG. 3
(58) Field of Classification Search ............... 15/250.3, 15/250.31; 296/96.15, 96.17; 403/DIG. 3, 403/24, 291, 220, 224
See application file for complete search history.

(56) References Cited

U.S. PATENT DOCUMENTS

| 3,910,652 | A | 10/1975 | Riester et al. ............ 308/26 |
| 6,216,309 | B1 * | 4/2001 | Goto et al. ............ 15/250.31 |
| 6,317,918 | B1 | 11/2001 | Kagawa et al. ............ 15/230.31 |
| 6,347,427 | B2 | 2/2002 | Kobayashi et al. ........ 15/250.31 |
| 6,505,376 | B1 | 1/2003 | Kagawa ............ 15/250.31 |
| 6,532,616 | B1 | 3/2003 | Eustache ............ 15/250.31 |

(Continued)

FOREIGN PATENT DOCUMENTS

DE    103 36 208    3/2005

(Continued)

OTHER PUBLICATIONS

Nov. 4, 2008 "Patents Act 1977 Examiination Report under Section 18(3)" for Application No. GB0606700.3.

(Continued)

*Primary Examiner*—Gary K Graham
(74) *Attorney, Agent, or Firm*—Bliss McGlynn, P.C.

(57) ABSTRACT

The present invention is a breakaway mounting bracket assembly for a wiper system that displaces components of the wiper system below the impact line of a vehicle in the event of, for example, a vehicle-pedestrian impact. The assembly includes a mounting bracket and a grommet removably attached to the mounting bracket. The assembly also includes a ferrule disposed within the grommet that includes a column having an internal passage and a platform connected to the column. The assembly also includes an attachment member to connect the mounting bracket to the vehicle where the attachment member includes a body engaged to the internal passage. The platform breaks away from the column in the event of a predetermined load acting on the pivot shaft assembly, which disconnects the grommet from the ferrule and thereby displaces the pivot shaft assembly and a portion of a wiper arm below the impact line of a vehicle.

5 Claims, 4 Drawing Sheets

U.S. PATENT DOCUMENTS

| | | | |
|---|---|---|---|
| 6,568,023 B2 | 5/2003 | Perin et al. | 15/250.3 |
| 6,718,592 B2 | 4/2004 | Ohashi et al. | 15/250.31 |
| 6,901,623 B2 | 6/2005 | Ohashi et al. | 15/250.31 |
| 2004/0140687 A1 | 7/2004 | Kalchschmidt et al. | 296/96.17 |
| 2005/0039290 A1* | 2/2005 | Morin et al. | 15/250.3 |

FOREIGN PATENT DOCUMENTS

| | | | |
|---|---|---|---|
| EP | 1040972 | * | 10/2000 |
| FR | 0115886 | | 12/2001 |
| GB | 2 347 340 A | | 9/2000 |
| GB | 2 424 823 | | 10/2006 |
| WO | WO 03/047926 | | 6/2003 |
| WO | WO 2004/113134 A1 | | 12/2004 |

OTHER PUBLICATIONS

Jan. 6, 2009 "Response to Examination Report" for Application No. GB0606700.3.

Apr. 4, 2008 "Patents Act 1977 Examiination Report under Section 18(3)" for Application No. GB0606700.3.

Sep. 11, 2008 "Response to Apr. 4, 2008 Official Communication" for Application No. GB0606700.3.

Fredriksson R., Haland Y., Yang J., *Evaluation of a new pedestrian head injury protection system with a sensor in the bumper and lifting of the bonnet's rear edge*, Paper No. 131, 17th International Conference on the Enhanced Safety of Vehicles (ESV), Jun. 2001, Amsterdam, Holland.

* cited by examiner

ABSTRACT# BREAKAWAY MOUNTING BRACKET ASSEMBLY FOR A WIPER SYSTEM

CROSS-REFERENCE TO RELATED APPLICATION(S)

This application claims benefit of U.S. Provisional Patent Application Ser. No. 60/668,024 entitled "Wiper Mounting Bracket Assembly Having a Break-Away Ferrule and Wiper System Incorporating Same" and filed on Apr. 4, 2005.

BACKGROUND OF THE INVENTION

1. Field of the Invention

The present invention relates, generally, to windshield wiper systems. More specifically, the present invention relates to a breakaway mounting bracket assembly for a wiper system that displaces a portion of the wiper system below the impact line of a vehicle upon receipt of a predetermined load such as during a vehicle-pedestrian impact.

2. Description of the Related Art

Impacts between vehicles and pedestrians are a concern for automakers. In order to minimize the likelihood of vehicle-pedestrian impacts, OEMs provide automobiles including safety features such as anti-lock brakes and traction control systems. However, such features do little to reduce the severity of injury to a pedestrian should such an impact occur.

Nevertheless, there is an ongoing evaluation of the designs of automobiles in an effort to reduce the severity of injury to a pedestrian upon impact with a vehicle. Specifically, OEMs have begun to evaluate what is commonly referred to as an "impact line" of a vehicle. A vehicle's impact line is defined by points of contact made by a pedestrian upon impact of a vehicle. As a result of the different makes and models of automobiles as well as the physical features of a pedestrian, the impact line can vary. However, despite these variances, the region where the hood meets with the windshield is a common point of contact on virtually all impact lines. This region is commonly referred to as the "engine plenum" and is often where components of windshield wiper systems are located.

Windshield wiper systems commonly include a wiper assembly that contacts the surface to be wiped, a wiper arm that supports the wiper assembly as it moves across the surface to be wiped, and a linkage assembly having a pivot shaft assembly that interconnects the wiper arm assembly to a drive mechanism. The pivot shaft assembly transfers movement of the linkage assembly to the wiper arm. Due to its role in facilitating movement of the wiper arm, the pivot shaft assembly is operatively connected to several moving components of the linkage assembly and therefore complex to assemble and repair, if necessary. Furthermore, the pivot shaft assembly and the wiper arm are often operatively connected together at or above the impact line for a vehicle-pedestrian impact and therefore presents a risk of causing greater injury to pedestrians upon impact when compared to vehicle components located below the impact line.

In an attempt to reduce the number of wiper system components located above the impact line, windshield wiper systems in the related art have been proposed that include a pivot shaft assembly that retreats into the engine plenum upon application of a load to the wiper arm. Specifically, when subject to a predetermined load, the pivot shaft assembly separates from either the wiper arm or other components of the linkage assembly. However, since the pivot shaft assembly operatively connects several moving parts of the wiper system, repairing the damaged wiper system can be complex and costly. Further, since the severable pivot shaft assembly directly receives the load, false positives may be incurred. A false positive occurs when the pivot shaft retreats into the engine plenum upon application of a load other than that resulting from vehicle-pedestrian impact. By way of example, a false positive may be incurred during replacement of wiper assemblies.

As a result, there is a need in the art for a windshield wiper system that presents a reduced risk of increasing injury to pedestrians during a vehicle-pedestrian impact. Accordingly, there is a need in the art for a wiper system having components that retreat below the impact line upon receipt of a predetermined load but that is cost-effective and simple to repair. Furthermore, there is a need in the art for a wiper system having components that retreat below the impact line upon receipt of a predetermined load and that reduces the likelihood of false positives.

SUMMARY OF THE INVENTION

The present invention overcomes many limitations and disadvantages in the related art in a wiper system for use in connection with an automotive vehicle. To this end, the wiper system of the present invention includes a breakaway mounting bracket assembly including a mounting bracket adapted to attach a pivot shaft assembly of a wiper system to a portion of a vehicle. The breakaway mounting bracket assembly further includes a grommet removably attached to the mounting bracket. The grommet is adapted to dampen NVH at the point of attachment between the mounting bracket and a portion of the vehicle. The breakaway mounting bracket assembly also includes a ferrule operatively disposed within the grommet. The ferrule includes a column having an internal passage and a platform operatively connected to the column. The breakaway mounting bracket assembly also includes an attachment member adapted to connect the mounting bracket to a portion of the vehicle. The attachment member includes a body operatively engaged to the internal passage. The platform is adapted to breakaway from the column in the event of a predetermined load acting through a pivot shaft assembly and causing the grommet to disconnect from the ferrule and thereby displace the pivot shaft assembly and a portion of a wiper arm below the impact line of a vehicle for a pedestrian impact.

The present invention is also directed toward a breakaway mounting bracket assembly where the mounting bracket is adapted to breakaway from attachment with the grommet upon receipt of a predetermined load from a pivot shaft assembly. As the mounting bracket breaks away from the grommet, the pivot shaft assembly and a portion of a wiper arm are displaced below the vehicle's impact line for a pedestrian impact.

Thus, one advantage of the present invention is that the breakaway mounting bracket assembly displaces wiper system components below the impact line of a vehicle upon receipt of a predetermined load.

Another advantage of the present invention is that the breakaway mounting bracket assembly enables the components of the wiper system to move below the impact line while at the same time allows the pivot shaft assembly to remain intact.

Still another advantage of the present invention is that it provides a breakaway mounting bracket assembly that reduces costs associated with repairing the wiper system following the receipt of a predetermined load by reducing the need to reassemble the pivot shaft assembly.

Yet another advantage of the present invention is that it provides a breakaway mounting bracket assembly that is adjacent the point of impact of the predetermined load so as to reduce the likelihood of incurring a false positive.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
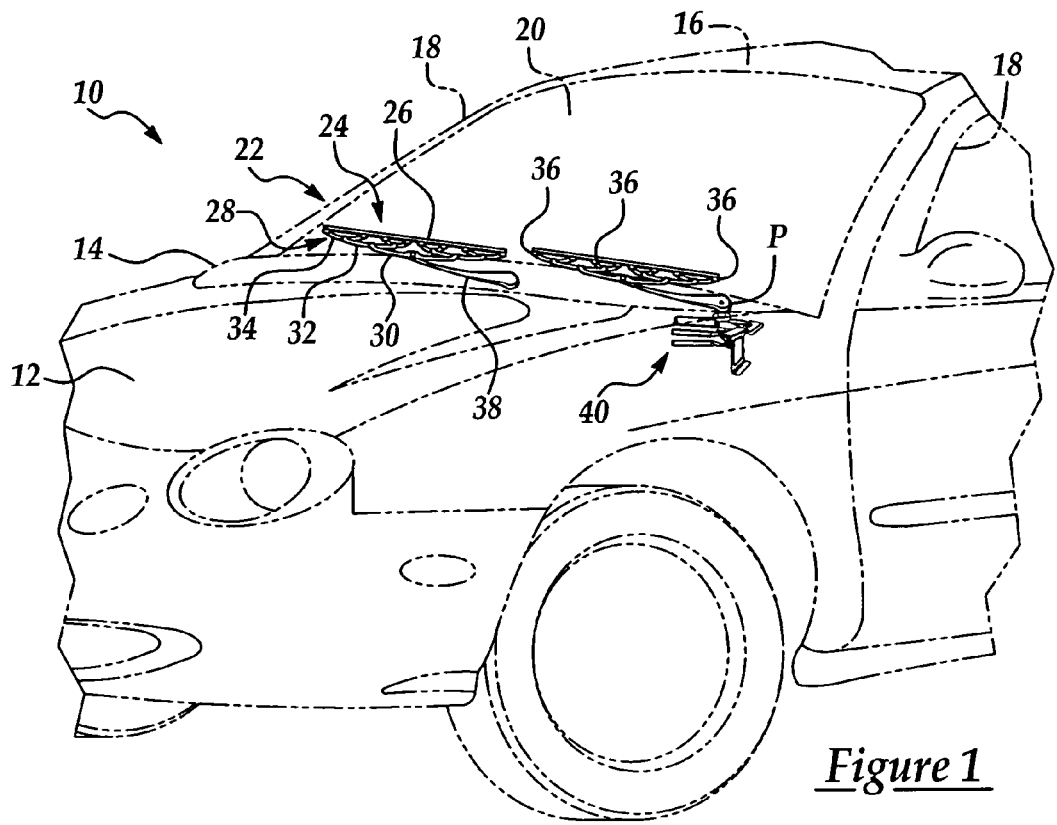
FIG. 1 is a partial perspective view of the front of an automotive vehicle having a windshield wiper system for reciprocal movement across the windshield of the vehicle.

Referring now to the Figures, where like numerals are used to designate like structure, a portion of an automotive body is illustrated in phantom at 10 in FIG. 1. The vehicle body 10 includes a hood 12, engine plenum 14, a roof 16 and a pair of laterally spaced front or "A" pillars 18 extending between the roof 16 and the plenum 14. The A-pillars 18, roof 16 and engine plenum 14 cooperate to define a generally rectangular opening in which is supported a curved or "swept back" glass windshield 20.

A windshield wiper system is generally indicated at 22 in FIG. 1 and is employed to clean the glass windshield 20. The system 22 includes at least one wiper assembly, generally indicated at 24. As shown in FIG. 1, the system 22 includes two wiper assemblies 24, which correspond to the driver and passenger side of the vehicle 10. The structure of the wiper assemblies 24 shown in FIG. 1 is identical. Accordingly, the structure of both wiper assemblies 24 may be understood with reference to only one wiper assembly 24. However, those having ordinary skill will appreciate that windshield wiper systems 22 may include any number of wiper assemblies 24 or wiper assemblies 24 of different lengths without departing from the scope of the present invention. Furthermore, while the present invention is described with respect to a windshield wiper system 22, those having ordinary skill in the art will appreciate that the present invention may be employed within other wiper systems. By way of example, the present invention may be employed within wiper systems for headlamps.

As shown in FIG. 1, the wiper assembly 24 includes an elongated wiping element 26 operable for wiping action against the windshield 20 and a "tournament" style superstructure generally indicated at 28. The superstructure 28 includes a primary lever 30, two secondary levers 32, and a series of two or more tertiary levers 34. The wiping element 26 is mounted to the superstructure 28 through claws 36 formed on the opposed distal ends of the tertiary levers 34. The tertiary levers 34 are each articulated to a secondary lever 32 at pivot points located at the opposed lateral ends of the secondary levers 32. Similarly, the secondary levers 32 are articulated to the primary lever 30 at pivot points located at the opposed, lateral ends of the primary lever 30. Those having ordinary skill in the art will appreciate that while the wiper assembly 24 is shown having a tournament style superstructure 28, different superstructures may be employed without departing from the scope of the invention. By way of example, the wiper assembly may include a beam-blade style superstructure rather than the tournament-style as shown.

The windshield wiper system 22 further includes a wiper arm 38 having one end operatively attached a corresponding wiper assembly 24 and another end pivotally mounted to a linkage assembly, as will be described in greater detail below. The wiper arm 38 is adapted to facilitate the oscillating movement of the wiper assembly 24 across the windshield 20 and may include a biasing member (not shown) such as a spring, which creates a force that is distributed to the wiper element 26 through the superstructure 28 to clean the windshield 20. The remaining components of the wiper system 22 are not visible from the exterior of the vehicle 10. Rather, the remaining components are generally located within the engine compartment and concealed by the engine plenum 14, hood 12, or other portions of the vehicle body.

As noted above, the wiper system 22 further includes a linkage assembly, generally indicated at 40. The linkage assembly 40 is interposed between a wiper motor (not shown) and the wiper arms 38 for translating rotational movement of the motor into pivotal movement of the wiper arm 38 across the windshield 20. The linkage assembly 40 includes a pivot shaft assembly, generally indicated at 42. The pivot shaft assembly 42 is adapted to operatively receive one end of the wiper arm 38 at a point of attachment (P). Accordingly, the number of pivot shaft assemblies 42 corresponds to the number of wiper arms 38 within the system 22. The linkage assembly 40 may further include a drive arm 44 operatively attached to the pivot shaft assembly 42 corresponding to the driver's side wiper arm 38 through a pivot lever 46. The drive arm 44 also powers the passenger's side wiper assembly 24 through a corresponding pivot shaft assembly by a similar pivot lever acting through the slave arm 47. A unitizing tube 48 extends between the pivot and shaft assemblies 42 corresponding to the driver and passenger side wiper arms 38. Those having ordinary skill in the art will appreciate that the linkage assembly 40 may take any number of different configurations or may be substantially eliminated in favor of a motor used to directly drive each wiper assembly 24 through the pivot shaft assemblies 42.

Referring to FIGS. 2, 3, 5, and 6, the pivot shaft assembly 42 includes a pivot shaft, generally indicated at 50, and a sleeve 52 through which the pivot shaft 50 is oriented. The pivot shaft 50 includes a base portion 54 that is mounted to the pivot lever 46 and a body 56 that extends from the base portion 54 through the sleeve 52. The pivot shaft 48 further includes a pivot head 58 that is adapted to engage a portion of the wiper arm 38 and a flanged portion 60 depending from the pivot head 58 to facilitate proper seating of the wiper arm 38 onto the pivot head 58. The orientation of the pivot shaft 50 relative to the sleeve 52 is adapted to provide rotational movement of the pivot shaft 50 within the sleeve 52 to direct the wiper arm 38 in an oscillating manner across the windshield 20. Specifically, the sleeve 52 remains stationary, fixed to the unitizing tube 48, and the base 54 of the pivot shaft 50 is secured to the pivot lever 46. As the drive arm 44 actuates the pivot lever 46, the pivot shaft 50 rotates within the sleeve 52, thereby moving the wiper arm 38. As is commonly known in the art, the pivot body 56 rotates within a field of lubricant, such as grease, that is packed within the sleeve 52 to reduce friction between the pivot shaft 50 and sleeve 52 during rotational operation.

To this end, the pivot shaft assembly 42 further includes a first pivot bearing 62 adjacent the base 54 of the pivot shaft 50 and second pivot bearing 64 adjacent the flanged area 60 of the pivot shaft 50 to provide a bearing surface during rotational movement of the pivot shaft assembly 42 as well as prevent lubricant from escaping through the terminal ends of the sleeve 52. The pivot shaft assembly 42 also includes a dampening member 66 to reduce the transfer of noise, vibration and harshness (NVH) to or from the wiper arm 38. Those having ordinary skill in the art will appreciate that the dampening member 66 may be made from any material that will reduce the transfer of NVH at this location. By way of example, the dampening member 66 may include a foam polymer washer, a rigid nylon sleeve, or the like.

The pivot shaft assemblies 42 further include breakaway mounting bracket assemblies, generally indicated at 68 to operatively secure the linkage assembly 40 to the vehicle 10. The breakaway mounting bracket assemblies 68 include a mounting bracket 70 that extends outwardly from the pivot shaft assembly 42 to engage a portion of the vehicle 10. More specifically, the mounting bracket 70 includes an engaging member 72 that that is adapted to be operatively attached to a portion of a vehicle in an under-mount manner. As shown throughout the Figures, the mounting bracket 70 is adapted to be operatively secured to the underside of a transversely extending portion of the body of a vehicle 10. However, those having ordinary skill in the art will appreciate that the mounting bracket assembly 70 may be operatively attached to any portion of the vehicle 10. By way of example, the mounting bracket assembly 70 may be attached to a portion of the engine plenum 14.

Figure 2:
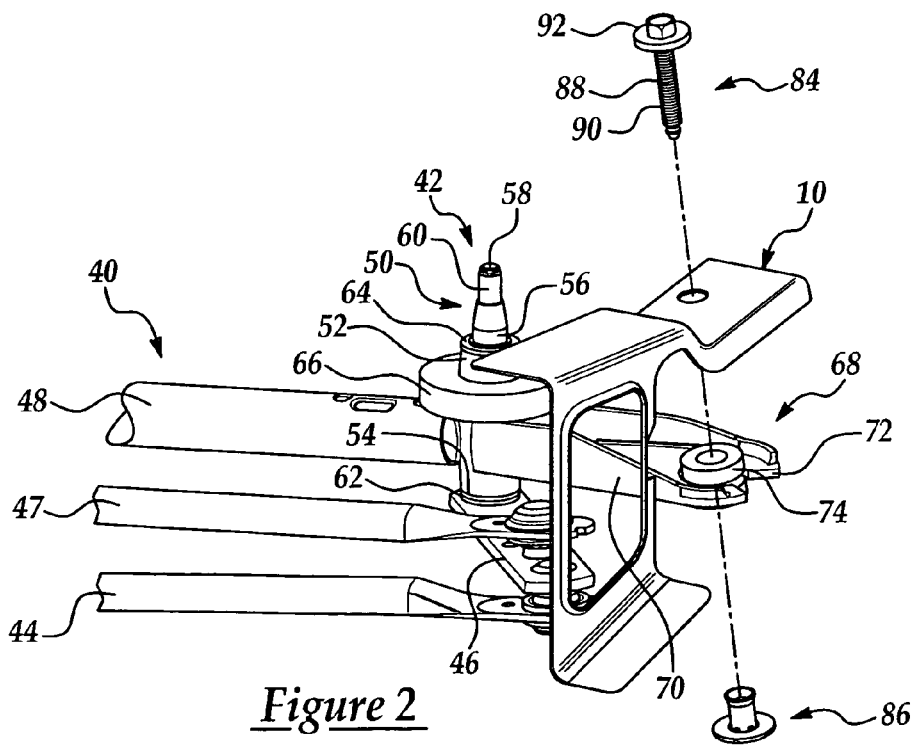
FIG. 2 is a partial perspective view of the linkage assembly of a wiper system including the breakaway mounting bracket assembly prior to attachment to a vehicle body in accordance with one embodiment of the present invention.
Figure 3:
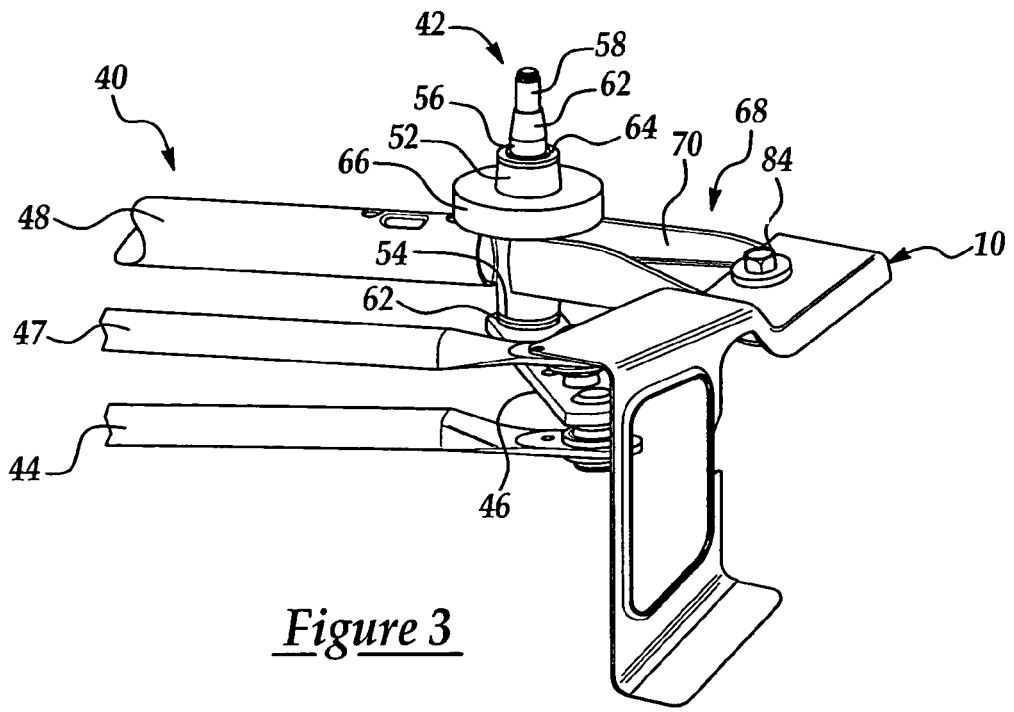
FIG. 3 is a partial perspective view of the linkage assembly of a wiper system and assembled breakaway mounting bracket assembly in accordance with one embodiment of the present invention.
Figure 5:
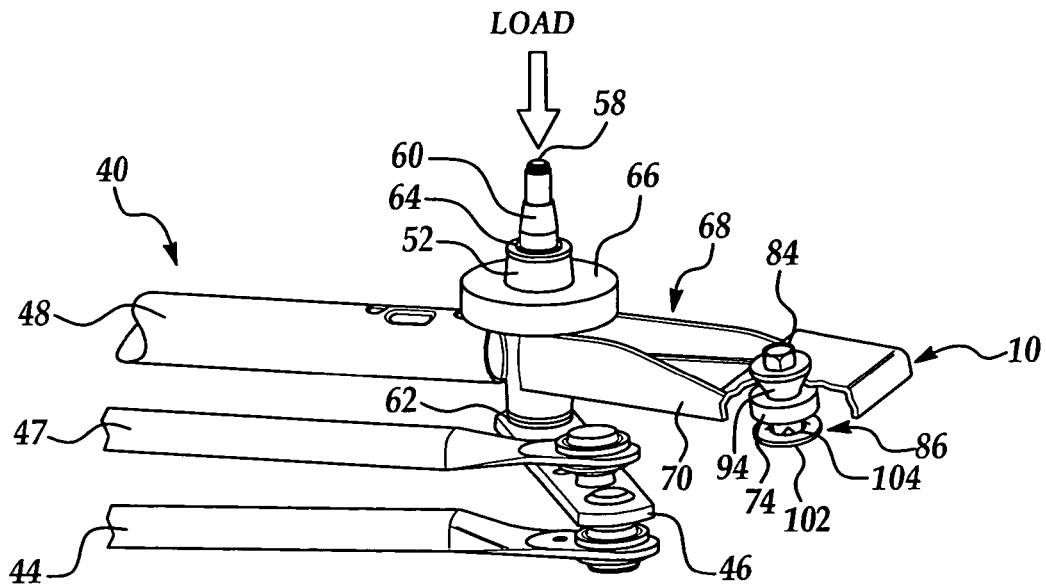
FIG. 5 is a partial perspective view of the linkage assembly of a wiper system where the breakaway mounting bracket assembly is shown in cut-away and receiving a predetermined load in accordance with the present invention.
Figure 6:
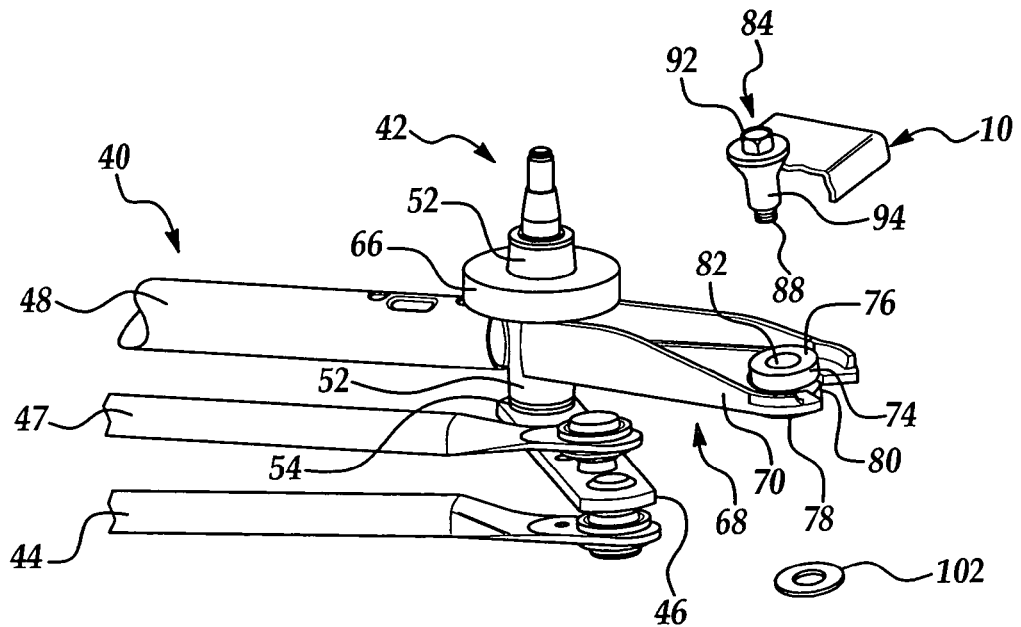
FIG. 6 is a partial perspective view of the linkage assembly of a wiper system where the ferrule of the breakaway mounting bracket assembly is severed following receipt of a predetermined load in accordance with one embodiment of the present invention.

Referring to FIGS. 2, 5 and 6, the mounting bracket assembly 68 further includes a grommet, generally indicated at 74 that acts to dampen NVH between the mounting bracket 70 and the portion of the vehicle 10 to which it is attached. The grommet 74 includes an upper hemisphere 76 and a lower hemisphere 78 and a horizontally extending slot 80 disposed between the two hemispheres 76, 78. The horizontal slot 80 is adapted to operatively receive the engaging member 72 of the mounting bracket 70. The grommet 74 further includes an aperture 82 extending vertically through the hemispheres 76, 78 that is adapted to operatively receive a portion of a ferrule, as described in greater detail below. Those having ordinary skill in the art will appreciate that the since the grommet 74 is adapted to dampen NVH, it may be constructed from material suitable for accomplishing the intended objective. By way of example, the grommet 74 of the present invention may be constructed from a polymer-based material having an NVH absorbing quality, such as Ethylene-Propylene-Diene-Monomer ("EPDM"). Further by way of example, the grommet 74 may be constructed from a material having an elastic and/or resilient quality such as rubber.

As illustrated in FIG. 2, the grommet 74 is mounted to the engaging member 72 of the mounting bracket 70 in a manner so as to locate the upper hemisphere between the mounting bracket 70 and a portion of vehicle 10 to which it will be attached. In this manner, the mounting bracket 70 is attached to a portion of the vehicle's body in an under-mount manner that enables at least the head 58 of the pivot shaft 50 to be visible from the exterior of the vehicle 10 to provide proper attachment to the wiper arm 38.

However, the point of attachment (P) between the pivot shaft assembly 42 and wiper arm 38 is often not only visible from the exterior of a vehicle 10, but located at or above the vehicle's impact line for a pedestrian-vehicle impact. As a result, a portion of the wiper arm 38 and pivot shaft assembly 42 and more particularly, the point of attachment (P) therebetween, may be impacted by a pedestrian during a pedestrian-vehicle impact. Accordingly, the breakaway mounting bracket assembly 68 of the present invention further includes an attachment member, generally indicated at 84, and a ferrule, generally indicated at 86 to direct the pivot head 58 of pivot shaft assembly 42 below the impact line upon receipt of a predetermined load.

Referring to FIGS. 2-6, the attachment member 84 is adapted to connect the mounting bracket 70 to a portion of the vehicle 10 and includes a body 88. The body 88 includes an exterior surface 90 that is adapted to provide positive attachment to the ferrule 86, as described in greater detail below. As shown throughout the figures, the attachment member 84 further includes a bulbous head 92 that contacts the body of a vehicle 10. The head 92 of the attachment member is adapted to provide a stop so that the breakaway mounting bracket assembly 68 may be securely mounted to a portion of the vehicle 10. However, those having ordinary skill in the art will appreciate that a bulbous head 92 is not a required limitation of the attachment member 84 of the present invention. By way of example, the attachment member 84 may include an anchoring stud or tab to provide secure attachment of the breakaway mounting bracket assembly 68 to the vehicle 10.

Figure 4:
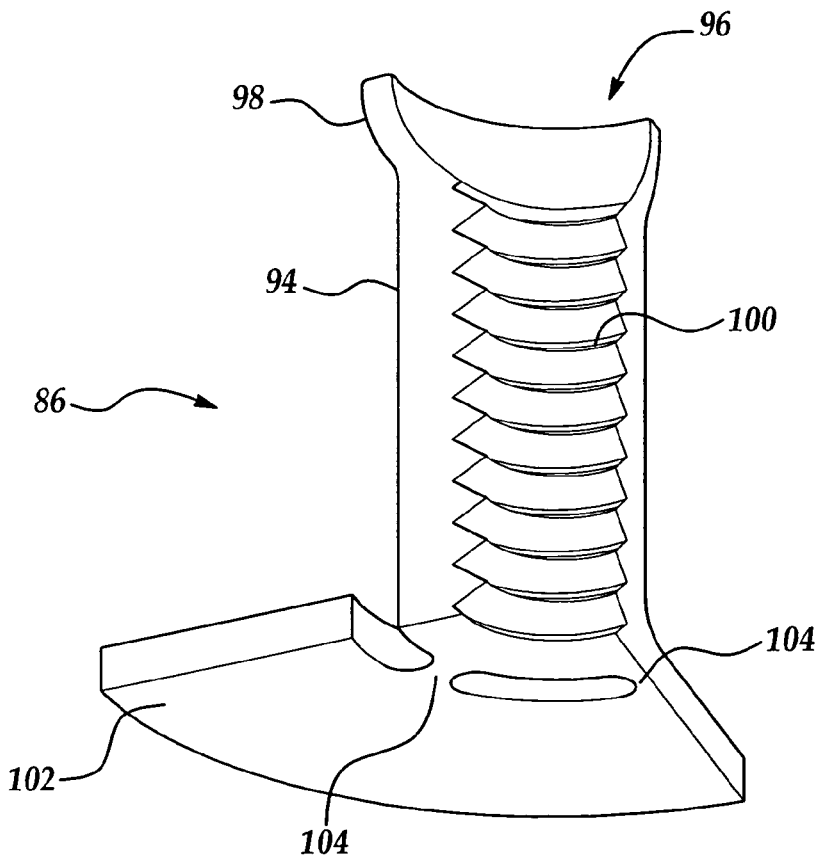
FIG. 4 is a cross-sectional perspective view of the ferrule of the breakaway mounting bracket assembly in accordance with one embodiment of the present invention.

Referring to FIG. 4, the ferrule 86 includes a column 94 having an internal passage 96 adapted to operatively receive the body 88 of the attachment member 84. More specifically, the column includes a flanged upper section 98 to facilitate positive alignment between the attachment member 84 and the internal passage 96. Additionally, the internal passage 96 includes a passage surface 100, which corresponds to the exterior surface 90 of the body 88 of the attachment member 84. As shown in FIG. 2, the exterior surface 90 is threaded in a screw-like manner. Accordingly, the passage surface 100 is cooperatively threaded to provide positive attachment of the breakaway mounting bracket assembly 68 to a portion of the vehicle 10. However, those having ordinary skill in the art will appreciate that the body 88 of the attachment member 84 may include other structure adapted to operatively engage the ferrule 86. By way of example, the body 88 may include a plurality of horizontal ribs or nodules adapted to operatively engage the ferrule 86 in a press-fit manner.

The ferrule 86 further includes a platform 102 operatively connected to the column 94. The ferrule 86 further includes a plurality of bridges 104 that operatively connect the column 94 to the platform 100. When the breakaway mounting bracket assembly 68 is attached to a portion of a vehicle 10, the ferrule 86 is operatively disposed within the grommet 74. As illustrated in FIG. 5, the column 94 is disposed within the aperture 82 of the grommet 74 and the lower hemisphere 78 is disposed between the mounting bracket 70 and the platform 102 to provide secure attachment between the breakaway mounting bracket assembly 68 and the body of a vehicle 10.

However, in the event of a predetermined load acting on the pivot shaft assembly 42 (such as that incurred during a vehicle-pedestrian impact), the platform 102 is adapted to breakaway from the column 94 and cause the grommet to disconnect from the ferrule, thereby displacing the pivot shaft assembly 42 below the impact line of a vehicle 10. As illustrated in FIG. 6, the bridges 104 are adapted to shear upon receipt of a predetermined load, thereby separating the column 94 from the platform 102. Those having ordinary skill in the art will appreciate that the amount of load required to shear the bridges 104 will vary from application to application. Accordingly, the dimensions, type of material, and number of bridges 104 will vary to accommodate the intended application.

Another embodiment of the breakaway mounting bracket assembly according to the present invention is generally indicated at 268 in FIGS. 7-10 where like numerals, increased by 200 with respect to the embodiment of the invention illustrated in FIGS. 2-6, are used to designate like structure. The breakaway mounting bracket assembly 268 as shown in FIGS. 7-10 includes similar structure as that of the breakaway mounting bracket assembly 68 shown in FIGS. 2-6 and so the description of such structure will not be repeated here except where expressly mentioned below.

Similar to the embodiment illustrated in FIGS. 2-6, the breakaway mounting bracket assembly 268 illustrated in FIGS. 7-10 is adapted to attach the pivot shaft assembly 242 portion of a wiper system 222 to a portion of a vehicle 210 as well as breakaway from attachment to the vehicle 210 in the event of a predetermined load acting thereon, such as during a vehicle-pedestrian impact. According to this embodiment, the breakaway mounting bracket assembly 268 includes a mounting bracket 270 and attachment member 284 having the same structure as the embodiment illustrated in FIGS. 2-6. However, as will be described in greater detail below, the engaging member 272 of the mounting bracket 270 includes a substantially oval periphery as opposed to the more circular periphery of the engaging member 72 shown in FIGS. 2-6.

Figure 7:
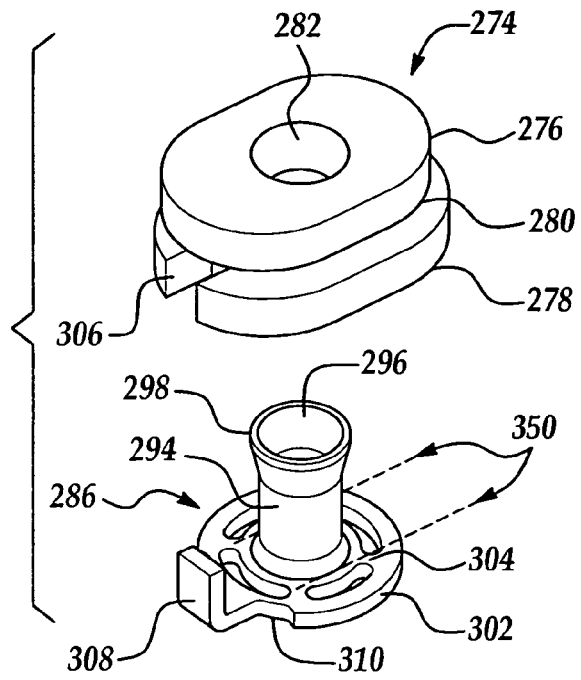
FIG. 7 is a fragmentary perspective view of a ferrule and grommet of the breakaway mounting bracket assembly in accordance with another embodiment of the present invention.
Figure 8:
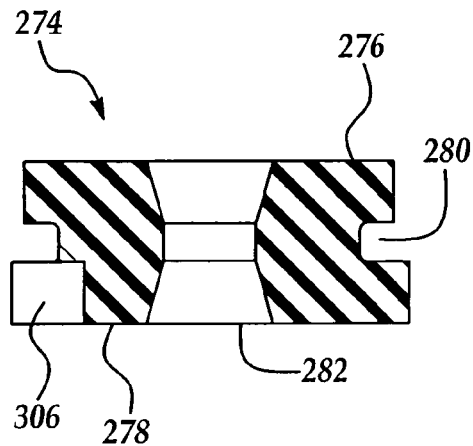
FIG. 8 is a cross-sectional view of the grommet of the breakaway mounting bracket assembly in accordance with the embodiment illustrated in FIG. 7.

As illustrated in FIG. 7, the grommet 274 of the breakaway mounting bracket assembly 268 includes a substantially oval periphery that is adapted to provide consistent orientation during attachment to the engaging member 272 of the mounting bracket 270. Accordingly, as noted above, the engaging member 272 includes a corresponding substantially oval periphery. The oval periphery of the engaging member 272 and the grommet 274 prevents rotation of the grommet 274 within the engaging member 272 during attachment of the breakaway mounting bracket assembly 268 to a vehicle 210. Additionally, referring to FIGS. 7 and 8, grommet 274 of the embodiment includes a key 306 adapted to receive a portion of the ferrule 286 and an aperture 282 having a substantially hourglass configuration, both of which will be described in greater detail below.

Figure 9:
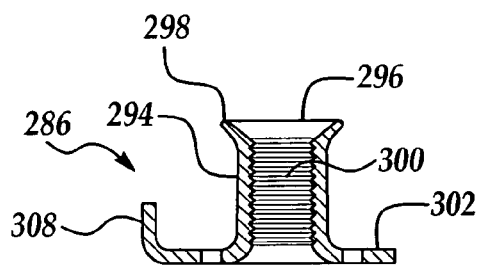
FIG. 9 is a cross-sectional view of the ferrule of the breakaway mounting bracket assembly in accordance with the embodiment illustrated in FIG. 7.
Figure 10:
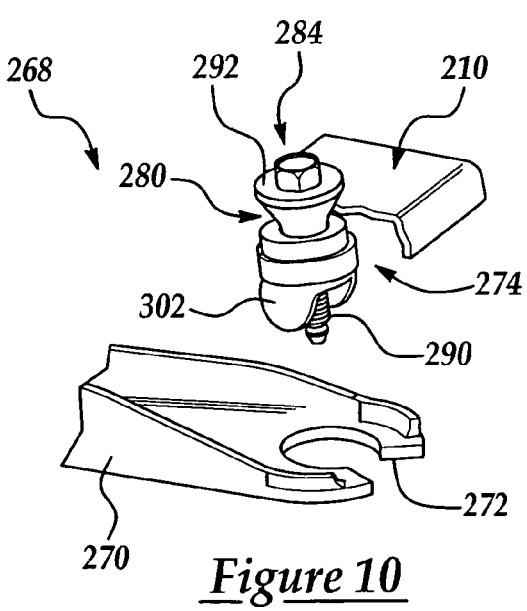
FIG. 10 is a partial perspective view of the breakaway mounting bracket assembly where the mounting bracket is displaced from the grommet following receipt of a predetermined load in accordance with the embodiment illustrated in FIG. 7.

Referring to FIGS. 7 and 9, the ferrule 286 of the breakaway mounting bracket assembly 268 includes a tab 308 that extends from the platform 302 in a manner substantially parallel to the column 294. The tab 308 is adapted to be operatively received by the key 306 within the grommet 274 to prevent rotation during attachment to the grommet 274. The tab 308 and the key 306 further cooperate to provide consistent orientation of the ferrule 286 relative to the grommet 274 during attachment.

The ferrule 286 further includes a column 294 operatively connected to a platform 302 by a plurality of bridges 304. Similar to the bridges 104 discussed relative to the embodiment of the present invention illustrated in FIGS. 2-6, the bridges 304 are adapted to facilitate displacement of the pivot assembly 242 below the impact line of a vehicle 10 for pedestrian impact. However, in the embodiment illustrated in FIGS. 2-6, the bridges 104 are sheared upon receipt of a predetermined load, thereby separating the column 94 from the platform 102 and causing a disconnect between the grommet 74 and the ferrule 86. Unlike the embodiment illustrated in FIGS. 2-6, the bridges 304 do not shear. Rather, in response to a predetermined load, the platform 302 folds along fold lines 350 (FIG. 7) to enable the mounting bracket 270 disengage from the grommet 274. As further illustrated in FIG. 10, the ferrule 286, grommet 274 and attachment member 284 remain connected to a portion of the vehicle 210 while the mounting bracket 270 breaks away from the grommet 274 to displace the pivot shaft assembly 242 below the impact line of a vehicle for pedestrian impact.

To facilitate the manner by which the displacement of the pivot shaft assembly 242 extends below the impact line, the platform 302 further includes relief notches 310 that cooperate with the bridges to define the fold lines along a specific location of the platform 302. Furthermore the hourglass configuration of the aperture 282 within the grommet 274 also cooperates to define the specific location of the fold lines. More specifically, the hourglass configuration directs force from a predetermined load toward the fold line as the grommet 274 flexes to accommodate release of the mounting bracket 270. Those having ordinary skill in the art will appreciate that the lower hemisphere 278 may also include a slightly smaller circumference than the upper hemisphere 276 to further direct the force of the predetermined load along the fold lines.

By employing a breakaway mounting bracket assembly 68, 268 of the present invention within a wiper system 22, 222, portions of the wiper system 22, 222 are displaced below the impact line of a vehicle 10, 210, yet remain intact. As a result, the breakaway mounting bracket assembly 68, 268 of the present invention helps to eliminate or reduce costly repairs associated with re-assembling the pivot shaft assemblies 42, 242 that sever from the pivot lever 46, 246 or include a crushable sleeve to displace a portion of the wiper system 22, 222 below the impact line. Furthermore, since the breakaway mounting bracket assembly 68, 268 does not directly receive the predetermined load, false positives that occur as a result of incidental loads received by the pivot shaft assembly 42, 242 are greatly reduced.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention maybe practiced other than as specifically described.

What is claimed is:

1. A breakaway mounting bracket assembly for a wiper system comprising:

A mounting bracket adapted to attach a pivot shaft assembly of a wiper system to a portion of a vehicle;

a grommet removably attached to said mounting bracket and adapted to dampen NVH at the point of attachment between said mounting bracket and a portion of the vehicle;

a one-piece ferrule operatively disposed within said grommet having a column including an internal passage, a platform and a plurality of bridges operatively connecting said column to said platform; and an attachment member adapted to connect said mounting bracket to a portion of the vehicle, said attachment member having a body operatively engaged to said internal passage, wherein said bridges are adapted to shear upon receipt of a predetermined load acting through a pivot shaft assembly such that said platform will breakaway from said column and cause said grommet to disconnect from said ferrule and thereby displace the pivot shaft assembly and a portion of a wiper arm below an impact line of a vehicle for a pedestrian impact.

2. The breakaway mounting bracket assembly as set forth in claim 1 wherein said column includes a flanged upper section, that is adapted to facilitate positive alignment between said attachment member and said internal passage.

3. The breakaway mounting bracket assembly as set forth in claim 1 wherein said mounting bracket extends outwardly from a pivot shaft assembly of a wiper system and includes an engaging member that is adapted to be operatively attached to a portion of a vehicle in an under-mount manner.

4. The breakaway mounting bracket assembly as set forth in claim 3 wherein said grommet includes an upper hemisphere, a lower hemisphere, a horizontal slot disposed therebetween and an aperture extending vertically therethrough, said slot adapted to operatively receive said engaging member and said aperture adapted to operatively receive said column.

5. The breakaway mounting bracket assembly as set forth in claim 1 wherein said body of said attachment member further includes an external surface and said internal passage further includes a passage surface that corresponds to said exterior surface to facilitate attachment therebetween.

* * * * *